United States Patent [19]

Benson

[11] 4,107,991

[45] Aug. 22, 1978

[54] RESISTANCE BRIDGE-TYPE FLOWMETER

[75] Inventor: James M. Benson, Hampton, Va.

[73] Assignee: Teledyne, Inc., Los Angeles, Calif.

[21] Appl. No.: 817,522

[22] Filed: Jul. 20, 1977

[51] Int. Cl.² ............................................. G01F 1/68
[52] U.S. Cl. ................................................... 73/204
[58] Field of Search ........................................ 73/204

[56] References Cited

U.S. PATENT DOCUMENTS 3,229,522  1/1966  Benson ................................. 73/204
3,818,758  6/1974  Easter .................................. 73/204

Primary Examiner—Richard C. Queisser
Assistant Examiner—John P. Beauchamp
Attorney, Agent, or Firm—Cushman, Darby & Cushman

[57] ABSTRACT

Flow of fluid through a heated electrically conductive conduit is measured by detecting changes in resistance of the conduit caused by the flow. A resistance bridge is connected to spaced points along the conduit for performing the measurement.

9 Claims, 7 Drawing Figures

RESISTANCE BRIDGE-TYPE FLOWMETER

BACKGROUND OF THE INVENTION

The present invention relates to a flowmeter wherein the rate of flow of fluid through a conduit is measured electrically.

It is known that a thermocouple may be connected to a heated conduit in order to measure fluid flow therethrough by sensing changes in thermoelectric voltages resulting from the flow. Such an arrangement is disclosed, for example, in U.S. Pat. No. 3,181,357 which issued to James M. Benson on May 4, 1965.

U.S. Pat. No. 3,229,522 granted to James M. Benson on Jan. 18, 1966 also teaches the use of thermocouple circuits for sensing the temperature variations in a heated conduit by measuring thermoelectric voltages.

With prior art arrangements of the type just described, the thermoelectric junctions are formed by wires of one material attached to a conduit of a different material selected to allow a useful thermoelectric e.m.f. to be developed at the junction. However, flowmeters of this type are limited to those materials which have useful thermoelectric characteristics. An additional shortcoming is that such flowmeters produce a d.c. thermoelectric output which inherently is more difficult to amplify than a.c.

Another method of determining fluid flow in a heated conduit measures the resistance of the conduit itself. An example of such an arrangement is that disclosed in U.S. Pat. No. 3,818,758 which was granted to Edmond Easter on June 25, 1974. In this patent, there is described a flowmeter wherein the change in resistance of a heated conduit resulting from fluid flow therethrough is detected by a Wheatstone bridge circuit connected to a point on the conduit. The resistance variations are a function of the flowrate. Therefore, the response of the bridge to resistance changes is utilized to measure the flow.

However, the changes in resistance of a heated conduit resulting from fluid flow therethrough are quite small and are not uniform over the length of the conduit. Consequently, a Wheatstone bridge connected to a single point along the conduit measures the total resistance change of the conduit thereby producing a measurement of the average resistance change per unit flow rather than the maximum change. Thus, the Wheatstone bridge measurement is inherently a somewhat inaccurate one.

SUMMARY OF THE INVENTION

To overcome the deficiencies of a flowmeter such as is disclosed in U.S. Pat. No. 3,818,758, the present invention joins a Kelvin or double bridge to spaced points along the heated conduit. Such a bridge provides very accurate measurement of low resistances. Additionally, since the bridge is connected to spaced points on the conduit, it measures the resistance of a conduit segment. Therefore, the segment measured can be selected to provide maximum resistance change per unit flow or to optimize some other parameter such as linearity.

The invention now will be described in further detail with reference to the accompanying drawings wherein.

DETAILED DESCRIPTION OF THE INVENTION

Figure 1:
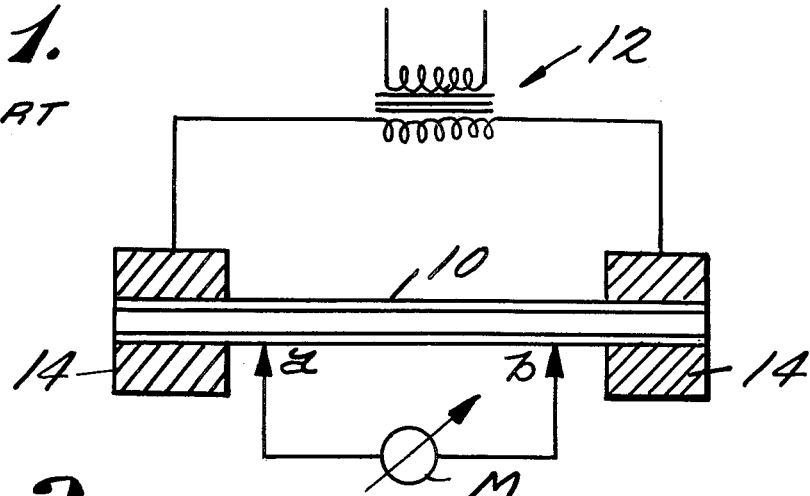
FIG. 1 is a schematic drawing illustrating a prior art arrangement for measuring flow through a conduit utilizing thermocouples.

In order to facilitate an understanding of the invention, a brief description of a prior art arrangement previously discussed now will be presented. Referring to FIG. 1, a typical arrangement of an electrically and thermally conductive conduit 10 and heating arrangement 12 are illustrated. The conduit is supported at its ends by electrically conductive heat sinks 14 to which the heating arrangement 12 is connected. The heat sinks are bodies of materials of such mass that their temperatures remain substantially at the ambient temperature of their surrounding and are not influenced by heating current being passed through them and the conduit 10. Thermocouples $a$ and $b$ are provided intermediate the ends of the conduit on opposite sides of its center. The thermocouples are joined to a meter M.

Figure 2:
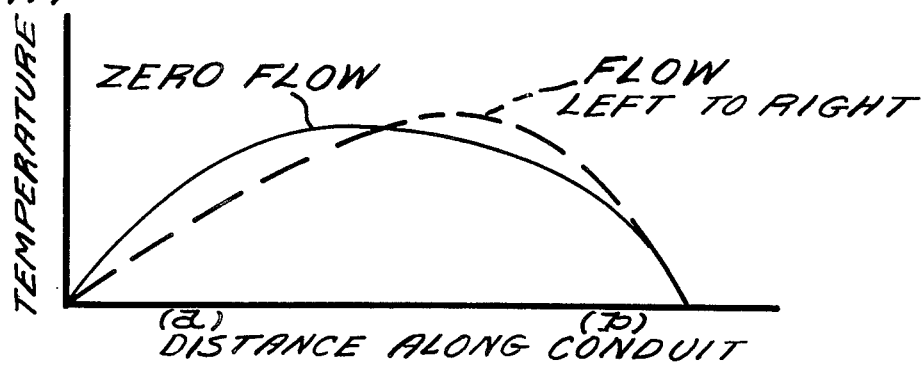
FIG. 2 is a graph illustrating the temperature distribution along the conduit shown in FIG. 1.

FIG. 2 illustrates how temperature varies along the length of conduit 10 for both flow and no-flow conditions. When there is no fluid flow in the conduit, the temperature of the conduit is at its maximum midway between heat sinks 14 as shown by the solid line. However, when fluid flows within the conduit, the temperature variation is distributed so as to assume a pattern such as that shown by the dash lines in FIG. 2.

A characteristic of prior art flowmeters of the type hereinbefore discussed is that the resistance of the conduit material varies with changes in temperature. Since the temperature along the conduit varies in accordance with the amount of flow therethrough, a plot of "conduit resistance v. distance along conduit" is analogous to the "temperature v. distance along conduit" relationship shown in FIG. 2 for both flow and no-flow conditions. Accordingly, it can be appreciated that the resistance change is not uniform over the length of the conduit when fluid flow occurs, and as a result, a resistance measuring arrangement, such as that disclosed in U.S. Pat. No. 3,818,758, which detects the resistance at a single point along the entire length of the conduit, measures the average resistance change per unit flow.

In contrast with the prior art arrangement exemplified by U.S. Pat. No. 3,818,758, the present invention measures the resistance change in only a segment of the entire conduit. The segment employed can be in the region of the conduit having maximum resistance change per unit flow, or it can be selected in accordance with the known response characteristics of the conduit so as to optimize some other parameter, such as linearity.

The present invention measures the resistance of a segment of the heated conduit by employing a double bridge such as the well-known Kelvin type disclosed, for example, in "Electrical Engineers Handbook" -

Knowlton, 8th Ed. This type of bridge is especially suited to measuring accurately the low resistance changes of a heated conduit resulting from changes in the fluid flow therethrough.

Figure 3:
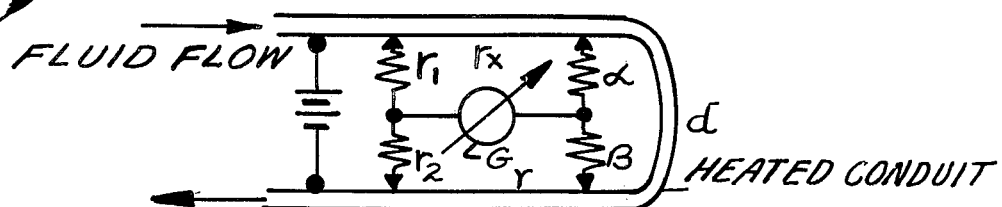
FIG. 3 is a schematic diagram of the basic bridge arrangement employed in carrying out the present invention.

FIG. 3 illustrates a Kelvin bridge arranged in operative relationship with a heated conduit. With no fluid flowing through the conduit and with the bridge balanced, the following relationship exists:

$$\frac{r_x}{r} = \frac{r_1}{r_2} + \frac{d}{r}\left(\frac{\beta}{\alpha + \beta + d}\right)\left(\frac{r_1}{r_2} - \frac{\alpha}{\beta}\right)$$

If $\frac{r_1}{R_2} = \frac{\alpha}{\beta}$, the value of $d$ has no effect, and thus:

$$\frac{r_x}{r} = \frac{r_1}{r_2}$$

When fluid flows through the conduit, $r_x$ and $r$ are affected differently for the reasons previously pointed out in connection with FIG. 2 and the analogous "conduit resistance v. distance along conduit" plot. Consequently, the bridge is unbalanced, and an appropriately calibrated reading appears on galvanometer G to reflect the quantity of fluid flow.

Figure 4:
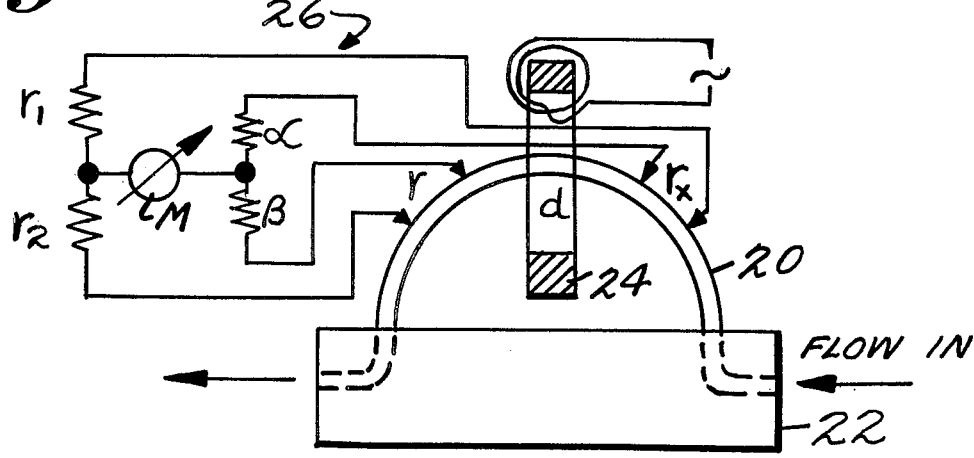
FIG. 4 is a schematic diagram of a first embodiment of the invention incorporating the bridge arrangement illustrated in FIG. 3.

Although FIG. 3 will function as a flowmeter, a preferred embodiment of the invention is illustrated in FIG. 4. A single conduit 20 having its ends passing through a heat sink 22 is heated by the a.c. excitation of an annular core 24 which surrounds a portion of the conduit 20, the latter serving as a shorted secondary of a transformer. A Kelvin bridge 26 is joined to the conduit at spaced points along its length. The relationship of the bridge resistances is the same as that described with respect to FIG. 3. Accordingly, when there is fluid flow within the conduit, the resistances $r$ and $r_x$ change by different amounts. Utilizing an a.c. detector M in the bridge, and preferably one that is phase sensitive, the magnitude and directional sense of fluid flow is measured.

Figure 5:
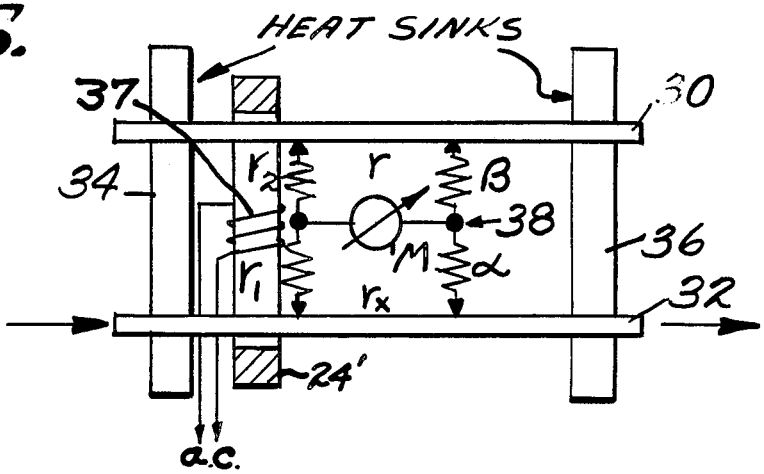
FIG. 5 is a schematic diagram of a second embodiment of the invention incorporating the bridge arrangement illustrated in FIG. 3.

A second embodiment of the invention is illustrated in FIG. 5. This embodiment employs a pair of conduits 30 and 32 connected at their ends to heat sinks 34 and 36. However, fluid flow occurs only through conduit 32. The arrangement for heating the conduits is well known as illustrated, for example, in U.S. Pat. No. 3,229,522. More particularly, an annular core of magnetizable material 24' surrounds conduits 30 and 32. A winding 37 is wound about core 24' for carrying current supplied by an a.c. voltage source whereby the conduits are heated. The Kelvin bridge is arranged to engage spaced points along each of the conduits. With the bridge balanced at no-flow conditions in each of the conduits 30 and 32, the meter M provides no indication. However, when fluid flows in conduit 32, the resistance $r_x$ changes, causing unbalance of the bridge and a flow measurement reading on meter M.

Figure 6:
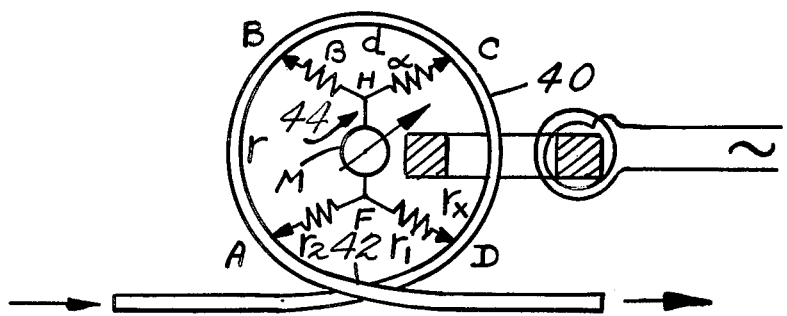
FIG. 6 is a schematic diagram of a third embodiment of the invention incorporating the bridge arrangement illustrated in FIG. 3.

FIG. 6 illustrates a third embodiment of the invention wherein the conduit 40 is formed in the shape of a loop having a contacting cross-over point 42 whereby the loop serves as a shorted secondary, allowing the conduit to be heated in the same manner as the arrangement of FIG. 4. With the values $r_1$, $r_2$, $\alpha$ and $\beta$ being equal and with the Kelvin bridge 44 joined to spaced points A–D along the loop whereby $r = r_x$ in a no-flow condition, points H and F are at the same potential. Subsequent fluid flow through the loop affects $r_x$ and $r$ unequally thereby unbalancing the bridge causing a reading on meter M. Once more, if the meter is phase sensitive, this reading will be representative of both the quantity of fluid flow and its direction.

Figure 7:
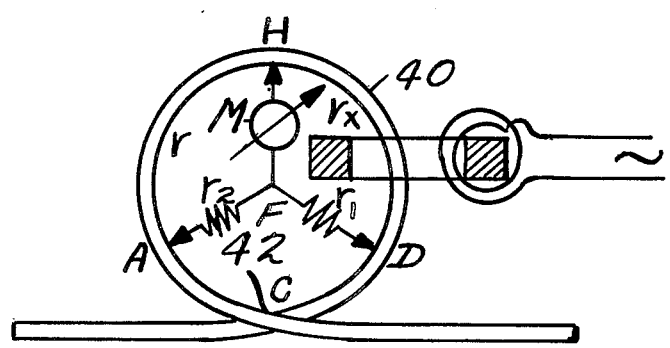
FIG. 7 is a schematic diagram of a variation of the embodiment illustrated in FIG. 6.

FIG. 7 represents a special case of the arrangement illustrated in FIG. 6. More particularly, if resistors $\alpha$ and $\beta$ both equal zero, point H may be joined to loop 40 at a location wherein $r_x$ and $r$ are equal in a no-flow condition. The operation of the FIG. 7 variation corresponds to that set forth with respect to FIG. 6.

What is claimed is:

1. A fluid flowmeter comprising:
   an electrically and thermally conductive conduit, said conduit having an electrical resistance which varies as a function of temperature;
   means for passing electrical current through said conduit thereby heating it;
   a resistance bridge joined to said conduit at spaced points along the conduit, said points defining at least one conduit segment;
   means for passing fluid through the conduit to vary the temperature and resistance of said segment so as to affect the balance of said bridge; and
   a meter operatively associated with the bridge for displaying the condition of balance of said bridge.

2. A fluid flowmeter as set forth in claim 1, wherein said bridge is connected at four points along the conduit thereby defining two spaced conduit segments, said segments comprising resistive elements of said bridge.

3. A fluid flowmeter as set forth in claim 2, wherein said bridge is of the double bridge type.

4. A fluid flowmeter as set forth in claim 2, wherein the balance of said bridge is dependent on a comparison of voltages across the respective conduit segments.

5. A fluid flowmeter as set forth in claim 2, wherein said conduit is connected at its ends to an electrically and thermally conductive heat sink.

6. A fluid flowmeter as set forth in claim 2, wherein said conduit includes a section formed in a closed electrical loop within which loop said segments are located, and wherein said means for heating the conduit comprises: a magnetizable core member linking said loop, and an a.c. voltage source for energizing said core.

7. A fluid flowmeter as set forth in claim 6, wherein said loop comprises an electrically shorted turn.

8. A fluid flowmeter as set forth in claim 1, further comprising:
   an additional electrically and thermally conductive flow circuit;
   means for electrically joining the ends of said conduits to form a closed electrical loop;
   said means for heating said conduit including a magnetizable core member linking said loop and an a.c. voltage source for energizing said core whereby both of said conduits are heated;
   said resistance bridge being joined to two spaced points on each of said conduits thereby defining a conduit segment on each conduit, said segments comprising resistive elements of said bridge; and
   said fluid passing means being joined only to the first-mentioned conduit.

9. A fluid flowmeter as set forth in claim 1, wherein said meter is phase sensitive to detect the direction of fluid flow in said conduit.

* * * * *